United States Patent [19]

Sartain

[11] 4,442,622
[45] Apr. 17, 1984

[54] FISHING LURE WITH RETRACTABLE HOOKS

[75] Inventor: Don M. Sartain, Wabasso, Fla.

[73] Assignees: Robert T. Esdale; Dorothy A. Esdale, both of Vero Beach, Fla.

[21] Appl. No.: 455,205

[22] Filed: Jan. 3, 1983

[51] Int. Cl.³ .............................................. A01K 83/02
[52] U.S. Cl. ........................................... 43/35; 43/37; 43/42.06
[58] Field of Search ..................... 43/42.04, 35, 36, 37, 43/34, 42.06

[56] References Cited

U.S. PATENT DOCUMENTS

| | | | |
|---|---|---|---|
| 1,131,909 | 3/1915 | Clarkson et al. | 43/42.06 |
| 1,486,028 | 3/1924 | Meighen | 43/35 |
| 2,244,980 | 6/1941 | Abramson | 43/35 |
| 2,878,611 | 3/1959 | Netherton | 43/42.06 |
| 2,976,641 | 3/1961 | Carmosino | 43/35 |
| 3,266,185 | 8/1966 | Abramson | 43/37 |
| 3,418,743 | 12/1968 | Halvosen | 43/37 |
| 4,102,075 | 7/1978 | Wagner | 43/42.06 |
| 4,237,643 | 12/1980 | Simons | 43/35 |

Primary Examiner—Gus T. Hampilos
Assistant Examiner—Marc Hodak

[57] ABSTRACT

A plug having hooks in its interior, mounted for swinging movements between a collapsed or inactive position in the interior and an extended or active position on the exterior. The hooks are normally held in collapsed position by a spring, and when a fish bites and pulls the line produces a reaction on the hooks and forces them outwardly to active position. The hooks are nearly hidden, or effectively hidden, when in a collapsed position, and the plug appears generally smooth, but is provided with flexible fins.

1 Claim, 4 Drawing Figures

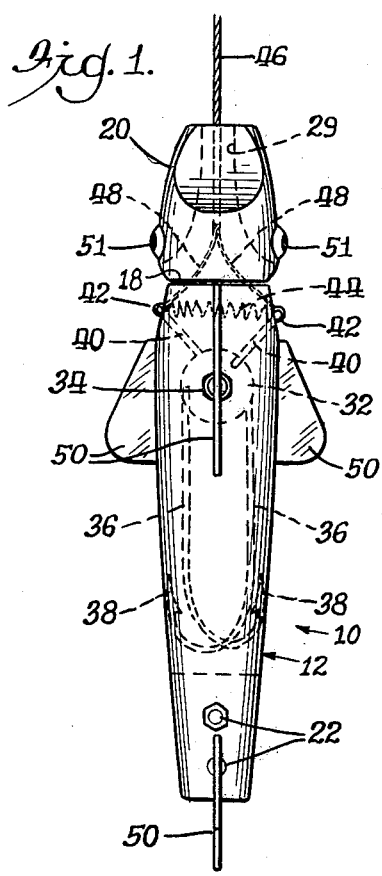
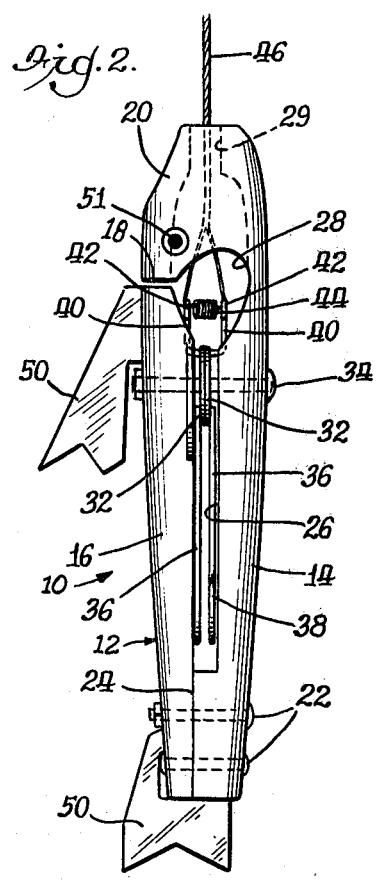
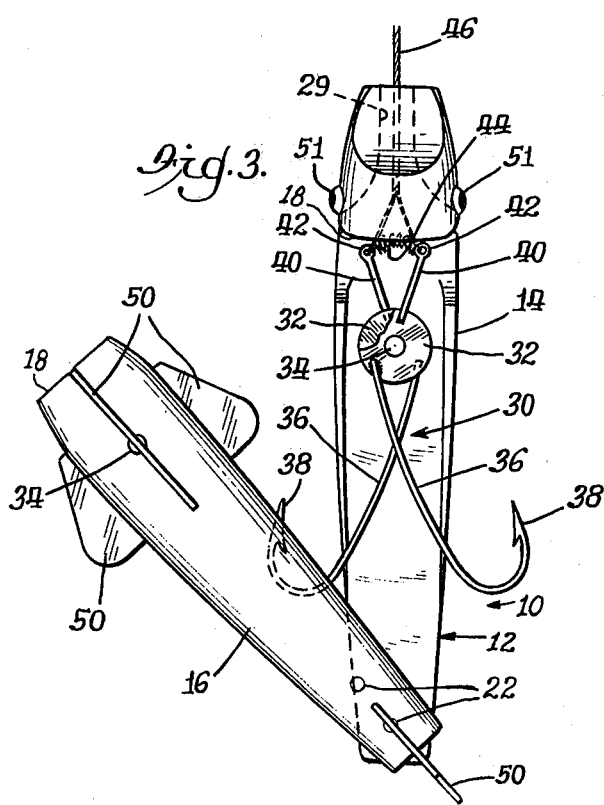
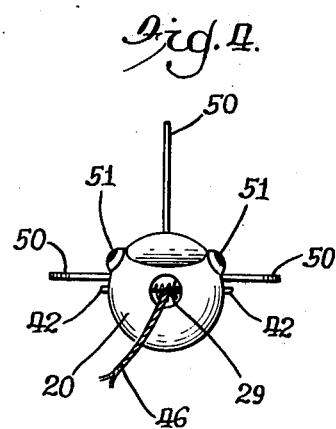

FISHING LURE WITH RETRACTABLE HOOKS

OBJECTS OF THE INVENTION

An object of the invention is to provide a fishing gear, having novel characteristics rendering it unusually effective for attracting fish.

Another object is to provide such gear which is unusually simple, generally in the form of a plug, but appearing as a fish, but having hidden hooks and which is effective, in response to pulling by the fish, after a bite, for moving the hooks out to an active position, whereby the fish is hooked.

DESCRIPTION OF A PREFERRED EMBODIMENT

In the drawings

FIG. 1 is a top elevational view of the fishing gear of the invention;

FIG. 2 is a view from the right of FIG. 1;

FIG. 3 is a view oriented according to FIG. 1, but showing the top part displaced for showing the internal construction; and FIG. 4 is a front end view of the gear.

Referring in detail to the drawings, the fishing gear in its entirety is indicated at 10 and includes a body 12 which is generally smooth and in the form generally of a plug, but shaped to appear as a fish. The plug 12 may be made of any suitable material, such for example as wood, plastic, etc., and includes two main parts, namely, a bottom part 14 and a top part 16. The top part 16 may be shorter than the bottom part, terminating at a parting line and forming a front or head portion 20 integral with the bottom part. The two parts are secured together by suitable bolts or rivets 22. The two parts at their rear end are fitted together tightly as indicated at 24, and forwardly thereof they are dimensioned to form a slot or rear cavity element 26 therebetween, continuing forwardly and terminating in a deeper cavity element 28 and opening through a hole 29 in the front end.

Mounted between the two parts of the plug, in the cavity 26, 28, are a pair of fishhooks 30 each including end parts secured as by soldering to washer element 32 fitted and pivoted on a pin 34 mounted in the body, for swinging movement as referred to again hereinbelow. The end parts of each hook include a main shank element 36 at one end, terminating in a hook element 38, and a second shank element 40 on the opposite side of the pivot axis relative to the main shank 36, each element 40 terminating in an eyelet or loop 42. The hook elements 38 are directed generally outwardly away from each other. Interposed between the eyelets 42 is a compression spring 44 operable for spreading them apart, and consequently swinging the main shank elements 36 and the hook elements 38 inwardly toward each other to a collapsed or inactive position shown in dotted lines in FIG. 1.

The two parts of the plug, when secured together, are held in alignment by the spacing of the bolts or rivets 22, and by the pin 34 in cooperation therewith.

The fish line is indicated at 46 and extends through the hole 29 and has branches 48 connected to the eyelets or loops 42. This connection with the eyelets 42 serves as the connection of the fish line to the plug.

In total effect, the plug appears as a fish, because of its shape and smoothness, and preferably the plug is provided with fins 50 and eyes 51, in further simulation of a fish. These fins are preferably flexible to produce the best effect.

The plug is cast into the water, and in normal activity in which it is drawn by the line, the compression spring 48 is sufficiently strong to hold the fishhooks in collapsed position against the pulling effect of the fish line. However when a fish bites the plug and pulls rearwardly thereon, the reaction of the fish line is such that, relative to the pulling effect rearwardly, it draws the eyelets 42 toward each other, the consequent result of the forward reaction of the fish line. This relative movement of the eyelets forwardly necessarily results in their being pulled together, and this in turn necessarily results in pivoting the hooks and moving the main shank elements 36 outwardly and the hook elements extend well beyond the confines of the body of the plug. As a consequence of this, the fish is hooked by the hook elements.

Another feature of the invention is that as the plug is pulled forwardly in the water, in its normal movements, water flows through the front opening 29 and then into the slot 28, 26 and out the sides of the latter. This movement of the water produces a bubbling effect, simulating fish, adding to further attraction to the fish.

The overall effect of the plug is that it is generally smooth, as a fish, and the cavity or slot 26, 28 is of small dimensions relative to the dimensions of the complete plug, and thus relatively inconspicuous. FIG. 3 serves to show the interior of the plug.

I claim:

1. A fishing gear comprising,
    a plug made up of a pair of parts fitted together in side-by-side relation and simulating a fish in size and shape,
    one of the parts constituting a bottom part and extending the full length of and determining the length of the plug, and having a head portion extending the depth of the plug, and having a hole of substantial size leading rearwardly from the front end through the head portion, and having a front cavity element at the rear of the head portion and the hole opening rearwardly into the cavity element,
    the other of the parts constituting a top part, and fitted on the bottom part, and the two parts being dimensioned and shaped in depth direction such that when they are so fitted together, they form therebetween a rear cavity element of relatively flat shape and of less depth than the front cavity element, and the two cavity elements intercommunicating and forming a common cavity opening sideways to the exterior throughout its length,
    a pair of fishhooks in the cavity, and means mounting them therein, the mounting means including a pin mounted in the plug parts and extending through the cavity and serving to secure the plug parts together at least at that position, the fishhooks each including a washer pivotally mounted on the pin, a main shank element and a hook element at one end and a second shank element at the other end, the shank elements being secured to the washer, the fishhooks being movable between a collapsed position in which they are substantially entirely within the cavity and an extended position in which the hook elements are positioned on the exterior, the second shank elements being in the front cavity element in both positions of the fishhooks,
    the fishing gear also including a compression spring between the second shank elements operable for normally moving the fishhooks to collapsed position, and a line element having branches connected respectively with the front ends of the second shank elements and leading forwardly through said hole, and adapted for connection to a fish line, the construction being operable, in response to a bite by a fish and effectively pulling rearwardly on the plug, and correspondingly producing a relatively forward reaction on the line, for effecting the swinging movement of the fishhooks to their extended position, the plug also including means securing the plug parts together at the rear end of the plug.

* * * * *